Nov. 21, 1933.   F. H. OWENS   1,936,204
OPTICAL SYSTEM FOR SOUND REPRODUCING APPARATUS
Filed May 6, 1929
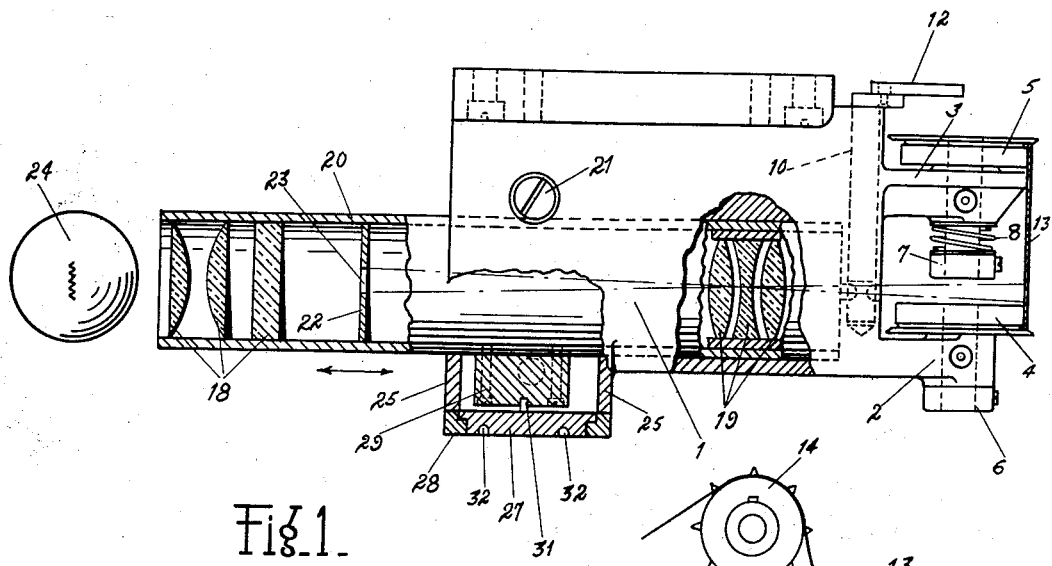
Fig. 1.
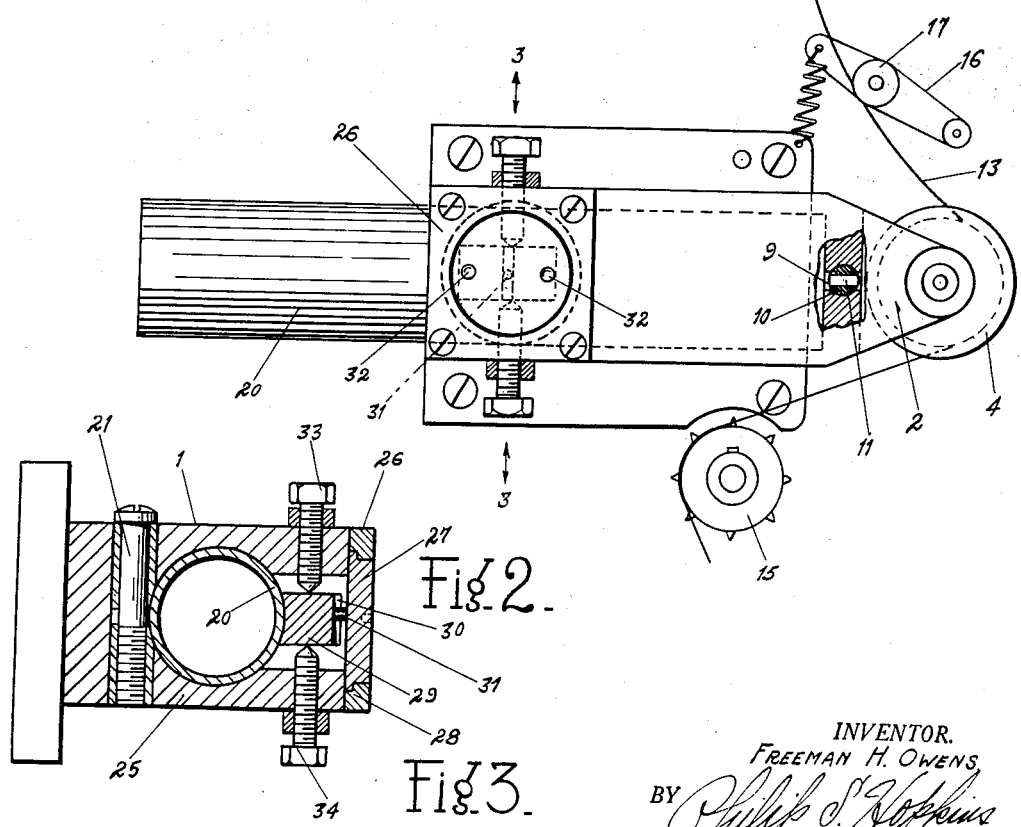
Fig. 2.
Fig. 3.
INVENTOR.
FREEMAN H. OWENS
BY Philip S. Hopkins
ATTORNEY Patented Nov. 21, 1933

1,936,204

UNITED STATES PATENT OFFICE 1,936,204

OPTICAL SYSTEM FOR SOUND REPRODUCING APPARATUS

Freeman H. Owens, New York, N. Y.

Application May 6, 1929. Serial No. 360,871

6 Claims. (Cl. 179—100.3)

This invention relates to improvements in an optical system for sound reproducing apparatus, the principal object of the invention being to provide in combination with a photographic film-supporting device, a unitary optical system so associated with said film-supporting device as to form a single unit for mounting in a sound reproducing device for photographic sound records, said unit having means for adjusting the optical system in axial and circumferential directions within the unit.

Other objects and advantages of the invention will appear as the description proceeds.

In the drawing accompanying this specification,

Figure 1 is a partly sectional plan view of an assembled device embodying the features of the present invention, portions of the housing being broken away for clearer illustration;

Figure 2 is a side elevation thereof; and

Figure 3 is a transverse sectional view taken approximately on the line 3—3 of Figure 2.

The same characters of reference designate the same parts in all the figures of the drawing.

Referring to the drawing, 1 designates a chambered housing, from one end wall of which extend a pair of brackets 2 and 3 respectively, and in bearings carried by said brackets are mounted for rotation and in axial alignment a pair of stud shafts each carrying at one end thereof a flanged roller, 4 and 5 respectively. The shaft of the roller 4 is maintained in its bearing against axial movement by a collar 6 secured on the end of said shaft opposite its roller. The roller 5, on the other hand to compensate for variation in width of film, is designed to have a slight axial movement toward and from the roller 4, and to this end the shaft of roller 5 extends toward roller 4 for some distance beyond its bearing and has secured thereon a collar 7, between which and the side of the bearing bracket is disposed a coil spring 8 encircling the stud shaft, whereby the shaft is normally urged toward the shaft of roller 4.

The end wall of the housing from which the brackets 2 and 3 extend is comparatively thick and is provided with an opening 9 communicating with the interior of the housing to permit the passage of light from the housing in a direction at right angles to the axes of the rollers 4 and 5. In order to provide a shutter for controlling said opening the said end wall has formed therein a bore extending transversely of the housing and intersecting the opening 9, in which bore is mounted a rod 10 having a transverse aperture 11 therein, which aperture, upon rotation of the rod can be brought into alignment with the opening 9 of the housing wall as shown in Figure 2, so as to permit free passage of light through said opening, or the rod rotated to carry its aperture into a position at right angles to the opening, thus closing the same against the emission of light. The rod 10 extends at one end beyond the wall of the housing and is provided with a handle or lever 12 for setting the shutter rod.

The rollers 4 and 5 are adapted to support a film 13 with a certain portion of the width of said film in the path of light emitted from the housing through the opening 9, said film being caused to travel on said rollers by means of sprockets 14 and 15, which may be operated in any suitable manner. It will be observed from Figure 1 that the opposing ends of the stud shafts carrying the rollers 4 and 5 are sufficiently far apart so that the passage of light from the opening 9 to the film is unobstructed. A spring tensioned pivoted arm 16 carrying a roller 17 may be provided for maintaining the film in taut condition during its travel from one sprocket to the other, over the supporting rollers 4 and 5.

In the present instance I have shown the lens assembly, comprising a condensing lens system 18 and a focusing system 19, mounted in a tube 20, near the opposite ends thereof, which tube is adapted to telescope within the housing 1, with its longitudinal center line in alignment with the opening 9 in the end wall of the housing. The tube is securely held in the housing by a removable screw 21 which engages the tube tangentially thereof, as clearly shown in Figure 3. At a suitable point between the condensing and focusing lenses is disposed within the tube 20 a partition 22 having a slit 23 therein, whereby when the device is mounted in a camera, or other apparatus, and the tube lined up with respect to a source of light such as a lamp 24 mounted in any suitable manner, not shown, and the rays of the latter will be collected by the condenser lenses 18 and illuminate the slit 23, whereupon the lenses 19 will focus the aerial image of the slit through the opening 9 in the end wall of the housing and upon the film 13 as it passes over the rollers 4 and 5 as hereinbefore described.

It is desirable that means be provided for affording accurate adjustment of the tube 20 both longitudinally and in the direction of rotation, and for this purpose, in the device illustrated herein I have provided the housing 1 with a laterally extending hollow boss 25, to the outer open end of which is suitably secured a plate 26 having a circular opening therein, and in said opening is mounted a rotatable disk 27, the disk and plate having a shouldered engagement at the inner side of the plate, as shown at 28, Figure 3, whereby the disk is retained against outward movement. The tube 20 is provided with a laterally extending lug 29 disposed within the boss 25, which lug has formed in its end face a slot 30 into which extends a pin 31 projecting from the inner surface of the disk 27 and which pin is mounted off center with relation to the disk. By reason of this construction it will be obvious that when the disk is rotated the tube 20 will be moved in the direction of its length forward or backward, depending on the direction of rotation of the disk. For rotating the disk, depressions 32 may be formed in its outer face for engagement by a suitable tool.

For adjusting the tube 20 in the direction of rotation a pair of screws 33, 34 are threaded in the opposite side walls of the boss 25 with their inner ends in engagement respectively with the opposite sides of the lug 29, whereby, as will be obvious, when one screw is turned in the "backing out" direction and the other in the forward direction the tube 20 will be caused to move in the direction of rotation, thus assuring a very fine and accurate adjustment.

It is believed that the operation of the device will be clear from the foregoing taken in connection with the drawing. The assembled unit is so mounted in the apparatus as to leave the housing exposed so that the adjusting devices for the tube are at all times accessible. When the film is in position on the rollers 4 and 5 and its sprocket operating mechanism ready for starting, the lever 12 is angularly displaced so as to open the shutter, it being understood that suitable stops will be placed on the outside of the housing to limit the rotation of the shutter between its fully closed and fully open position. The light is then admitted through the tube and is focused on the film by the lens system. In order to produce a sharp and properly aligned aerial image of the slit 23, or if for any reason the tube should need adjustment either longitudinally or in the direction of rotation, this can readily be accomplished by means of the adjusting devices hereinbefore described.

It will be understood, of course, without further illustration, that with my invention used as an optical unit in a sound reproducing apparatus, the film 13 will bear a photographic sound record which when the film is supported on the rollers 4 and 5, will be in alignment with the light beam passing through the housing 1. As is well known, such light will be modulated by the sound record and the modulated light will then be translated, amplified and rendered audible by suitable and well known devices for the purpose.

While I have described in detail the apparatus illustrated herein, as particularly adaptable for a sound reproducing apparatus, it will be understood that I do not thereby limit my invention to the precise features of construction shown in the drawing nor to such use, as I am aware that many other uses and mechanical changes and modifications may be made without departing from the spirit and scope of the invention as set forth in the appended claims.

1. A unitary optical system for photographic sound reproducing apparatus comprising a housing, a tube therein, a slit member in said tube, lenses in said tube in operative relation to said slit member, and means on said tube and on said housing cooperating to permit longitudinal and circumferential adjustment of said tube in said housing, said means comprising a lug on said tube having a slot therein, and a rotatable disk on said housing having a pin thereon offset centrally thereof and engaging in said slot.

2. In combination, a fixed housing, a film support on said housing comprising rollers, a unitary slit and lens assembly comprising a tube having a slit and condenser lenses and focusing lenses therein mounted in position to project light on a predetermined area of a film carried by said roller support and means for adjusting said tube axially in said housing with relation to said film roller support.

3. In combination, a fixed housing, a film support on said housing comprising rollers, a lens assembly comprising a tube having a slit and condenser lenses and focusing lenses therein mounted in position to project light on a predetermined area of a film carried by said roller support, means for adjusting said tube axially in said housing with relation to said film support, means for adjusting said tube circumferentially in said housing with relation to said film support, and means for positively retaining said lens assembly in any position of adjustment.

4. In combination, a fixed housing, a pair of axially aligned film supporting rollers mounted for rotation thereon, means for maintaining said rollers with their axes in spaced relation thereby to provide an unobstructed passageway across said axes, a unitary slit and lens assembly comprising a tube having a slit and condenser lenses and focusing lenses therein disposed in alignment with said passageway and adapted to project light therethrough, means for adjusting said lens assembly axially in said housing with relation to said passageway, and means for adjusting the less assembly circumferentially in said housing.

5. A support for a motion picture film having a limited sound record area thereon comprising a pair of spaced axially aligned rollers over which said film is movable, said rollers engaging the edges of said film, a light source on the opposite side of said rollers from said film, and means for focusing said light through an unrestricted path between said rollers to the sound record area only of said film.

6. A support for a motion picture film having a limited sound record area thereon comprising a pair of spaced axially aligned rollers over which said film is movable, said rollers engaging the edges of said film, a light source on the opposite side of said rollers from said film, means for focusing said light through an unrestricted path between said rollers to the sound record area only of said film, a sprocket for pulling said film over said rollers and tension means engaging said film for maintaining the same in contact with said rollers during its passage thereover.

FREEMAN H. OWENS.